(12) United States Patent
Signorini et al.

(10) Patent No.: US 9,239,882 B2
(45) Date of Patent: Jan. 19, 2016

(54) SYSTEM AND METHOD FOR CATEGORIZING ANSWERS SUCH AS URLS

(75) Inventors: Alessio Signorini, Pisa (IT); Alessandro Arzilli, Pisa (IT); Apostolos Gerasoulis, Edison, NJ (US); Antonino Gulli, Pisa (IT); Maurizio Sambati, Pisa PI (IT)

(73) Assignee: IAC Search & Media, Inc., Oakland, CA (US)

( * ) Notice: Subject to any disclaimer, the term of this patent is extended or adjusted under 35 U.S.C. 154(b) by 401 days.

(21) Appl. No.: 11/958,322

(22) Filed: Dec. 17, 2007

(65) Prior Publication Data

US 2009/0157640 A1 Jun. 18, 2009

(51) Int. Cl.
*G06F 7/00* (2006.01)
*G06F 17/30* (2006.01)

(52) U.S. Cl.
CPC .... *G06F 17/30867* (2013.01); *G06F 17/30707* (2013.01)

(58) Field of Classification Search
CPC ...................... G06F 17/30707; G06F 17/30867
USPC .......... 707/3, 6, 5, 999.005, 999.003, E17.14, 707/E17.109, 999.01, 736–759; 709/205; 726/4; 455/566, 550.1, 414.3, 466; 705/37, 14.58, 27, 14.46, 14.52
See application file for complete search history.

(56) References Cited

U.S. PATENT DOCUMENTS

| | | | |
|---|---|---|---|
| 6,574,616 B1 * | 6/2003 | Saghir | 382/305 |
| 7,107,226 B1 * | 9/2006 | Cassidy et al. | 705/26 |
| 7,181,447 B2 | 2/2007 | Curtis et al. | |
| 8,078,625 B1 * | 12/2011 | Zhang et al. | 707/748 |
| 2001/0049687 A1 * | 12/2001 | Russell | 707/104.1 |
| 2003/0014399 A1 * | 1/2003 | Hansen et al. | 707/3 |
| 2004/0260677 A1 | 12/2004 | Malpani et al. | |
| 2005/0050023 A1 * | 3/2005 | Gosse et al. | 707/3 |
| 2005/0203883 A1 * | 9/2005 | Farrett | 707/3 |
| 2005/0222903 A1 * | 10/2005 | Buchheit et al. | 705/14 |
| 2005/0246332 A1 * | 11/2005 | Wang et al. | 707/3 |
| 2006/0064504 A1 * | 3/2006 | Rechterman et al. | 709/238 |
| 2006/0161579 A1 | 7/2006 | Venguerov | |
| 2006/0195442 A1 * | 8/2006 | Cone et al. | 707/5 |
| 2007/0027856 A1 * | 2/2007 | Lee | 707/3 |
| 2007/0088692 A1 * | 4/2007 | Dean et al. | 707/5 |
| 2007/0192305 A1 * | 8/2007 | Finley et al. | 707/4 |
| 2007/0239682 A1 * | 10/2007 | Arellanes et al. | 707/3 |
| 2008/0059508 A1 * | 3/2008 | Lu et al. | 707/102 |
| 2008/0140641 A1 * | 6/2008 | Wang | 707/5 |
| 2008/0162473 A1 * | 7/2008 | Fitzer et al. | 707/6 |
| 2009/0089373 A1 * | 4/2009 | Donato et al. | 709/205 |
| 2010/0121705 A1 * | 5/2010 | Ramer et al. | 705/14.46 |

OTHER PUBLICATIONS

G. Attardi, Automatic Web Page Categorization by Link and Context Analysis, 1999, Proceedings of THAI, version 2, pp. 1-16.*
IAC Search & Media, PCT/US2008/004495 Filed Apr. 7, 2008, International Search Report and Written Opinion, ISA/US, mailed Jul. 8, 2008, 8pp.

* cited by examiner

*Primary Examiner* — Taelor Kim
(74) *Attorney, Agent, or Firm* — Stephen M. De Klerk

(57) ABSTRACT

A correlator extracts a plurality of related queries corresponding to each one of a plurality of answers. A classifier matches each one of the related queries corresponding to the answer with a category. A statistical tool determines the relevance of each category relative to the categories matched to the related queries corresponding to the answers.

19 Claims, 16 Drawing Sheets

FIG. 9

SYSTEM AND METHOD FOR CATEGORIZING ANSWERS SUCH AS URLS

BACKGROUND OF THE INVENTION

The internet is often used to obtain information regarding news, businesses, events, movies, etc. in a specific geographic area. A user interface is typically stored on a server computer system and transmitted over the internet to a client computer system. The user interface typically has a search box for entering a text search query. A user can then select a search button to transmit a search request from the client computer system to the server computer system. The server computer system then compares the text with data in a database or data source and extracts information based on the text from the database or data source. The information includes uniform resource locators (URLs) or other answers pertaining to the text search query. The information is then transmitted from the server computer system to the client computer system for display at the client computer system.

SUMMARY OF THE INVENTION

The invention provides a computer system, including a memory, a plurality of answers stored in the memory, and a classifier for matching each one of the answers with a category among a plurality of categories.

The computer system may further include a correlator utilizing the answer to extract at least one data query corresponding to the answer, the classifier matching the data query with the category.

The correlator may match the answer to the category according to the method including extracting a related query corresponding to the data query, and matching the related query to the category.

The correlator may match the answer to the category according to the method including extracting a plurality of related queries corresponding to the data query, and the categorizer matching each related query to a category, further including a statistical tool determining the relevance of each category.

The answers may be received over a network before storing the answers.

The answers for more frequently used categories may be updated more often than answers for categories used less often.

One of the categories may be a spam category, and answers in the spam category may not be downloaded.

The computer system may further include an indexer indexing the answers received over the network into indexed answers, the indexed answers being stored in the memory.

The indexer may index the answers into the categories.

The computer system may further include a search engine receiving a request from a client computer system at a server computer system and, in response to the request, transmitting a view from the server computer system to the client computer system for display at the client computer system, contents of the view being at least partially based on one selected category of the categories.

The request may be a search request, the classifier matching the request with a category among the plurality of categories, and associating at least one of a plurality of answers with the request due to association of the request and the answer with the select category.

The view may include different category areas, answers belonging to different categories being located in the respective category areas.

The category may be used to select the answer based on a media type of the answer.

The category may be used to select the answer based on a freshness of the answer.

The computer system may further include a correlator extracting a related query corresponding to the request, wherein the classifier matches the request with a category by matching the related query to the category.

The correlator may match the request to the category according to the method including extracting a plurality of related queries corresponding to the request, the categorizer matching each related query to a category, further including a statistical tool determining the relevance of each category.

The search engine may transmit a first view from a server computer system to the client computer system, the first view including a search identifier, the search engine receiving a search request from a client computer system at the server computer system and utilizing the search request at the server computer system to extract at least one search result from the answers, and transmitting at least part of a second view from the server computer system to the client computer system for display at the client computer system, wherein the second view includes the search result.

An advertisement may be selected among a plurality of advertisements based on the select category.

The request may be a browsing request based on the selected category selected at the client computer system among at least a subset of the categories.

The invention also provides a computer method, including storing a plurality of answers in memory of a computer, and matching each one of a plurality of the answers with a category among a plurality of categories.

In the method, each answer may be matched with a category according to the method including utilizing the answer to extract at least one data query corresponding to the answer, and matching the data query with the category.

The method of matching the answer to the category may further include extracting a related query corresponding to the data query, and matching the related query to the category.

The invention also provides a computer-readable medium having stored thereon a set of instructions which, when executed by a processor of a computer, executes the method including storing a plurality of answers in memory of a computer, and matching each one of a plurality of the answers with a category among a plurality of categories.

BRIEF DESCRIPTION OF THE DRAWINGS

The invention is further described by way of example with reference to the accompanying drawings, wherein:

FIG. 9 is a screenshot showing a view wherein a URL and query classification have been used to return results;

DETAILED DESCRIPTION OF THE INVENTION

Figure 1:
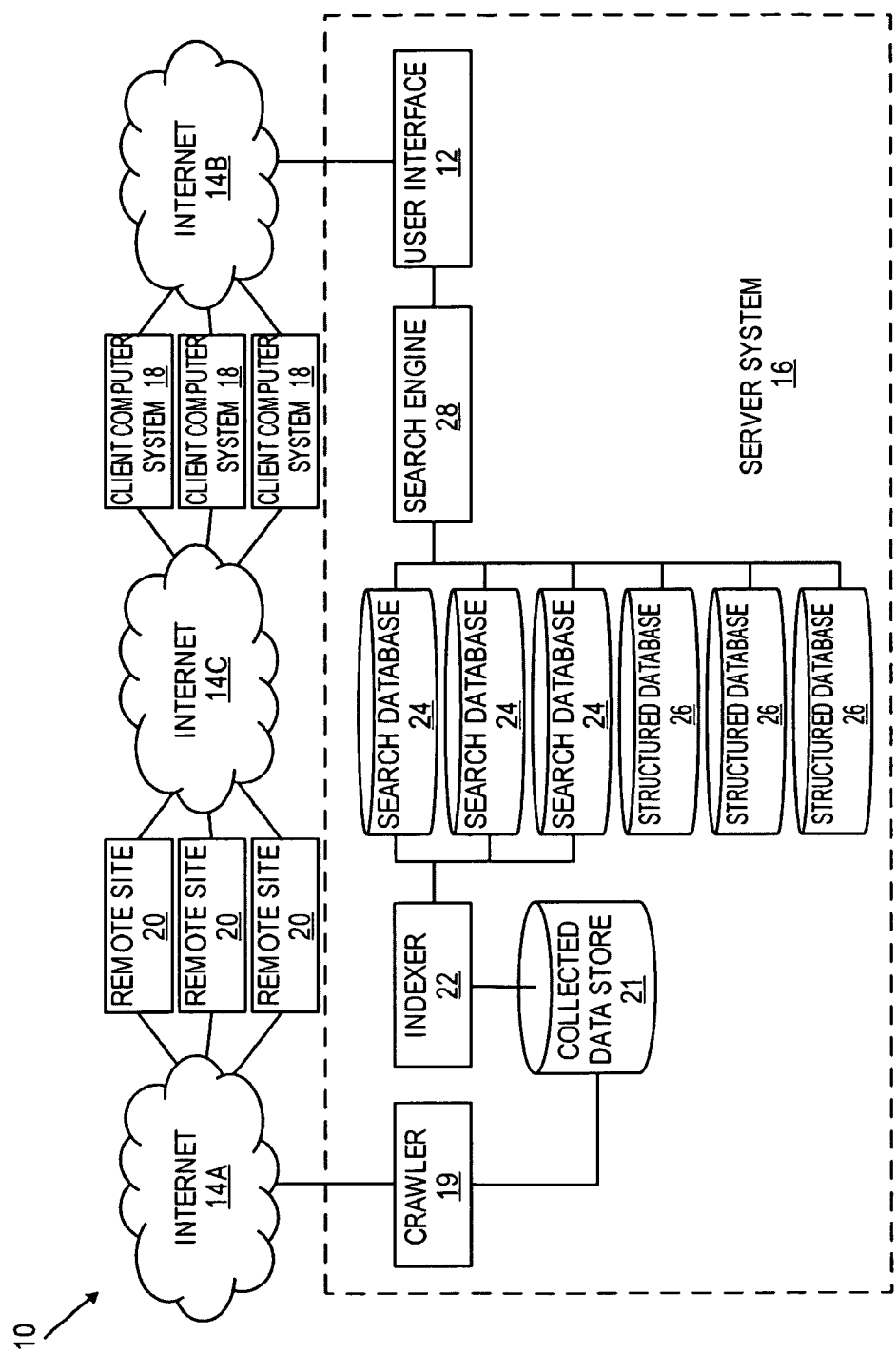
FIG. 1 is a block diagram of a network environment in which a user interface according to an embodiment of the invention may find application.

FIG. 1 of the accompanying drawings illustrates a network environment 10 that includes a user interface 12, according to an embodiment of the invention, including the internet 14A, 14B, and 14C, a server computer system 16, a plurality of client computer systems 18, and a plurality of remote sites 20.

The server computer system 16 has stored thereon a crawler 19, a collected data store 21, an indexer 22, a plurality of search databases 24, a plurality of structured databases and data sources 26, a search engine 28, and the user interface 12. The novelty of the present invention revolves around the user interface 12, the search engine 28, and one or more of the structured databases and data sources 26. The crawler 19 is connected over the internet 14A to the remote sites 20. The collected data store 21 is connected to the crawler 19, and the indexer 22 is connected to the collected data store 21. The search databases 24 are connected to the indexer 22. The search engine 28 is connected to the search databases 24 and the structured databases and data sources 26. The client computer systems 18 are located at respective client sites and are connected over the internet 14B and the user interface 12 to the search engine 28.

Figure 2:
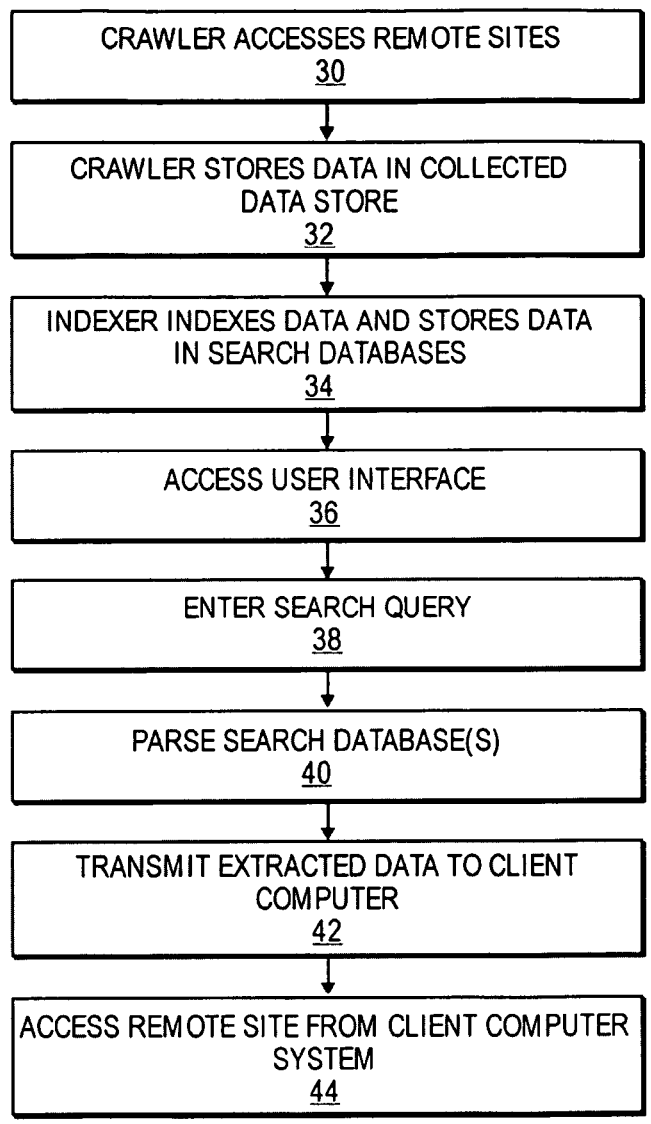
FIG. 2 is a flowchart illustrating how the network environment is used to search and find information.

Reference is now made to FIGS. 1 and 2 in combination to describe the functioning of the network environment 10. The crawler 19 periodically accesses the remote sites 20 over the internet 14A (step 30). The crawler 19 collects data from the remote sites 20 and stores the data in the collected data store 21 (step 32). The indexer 22 indexes the data in the collected data store 21 and stores the indexed data in the search databases 24 (step 34). The search databases 24 may, for example, be a "Web" database, a "News" database, a "Blogs & Feeds" database, an "Images" database, etc. The structured databases and data sources 26 are licensed from third-party providers and may, for example, include an encyclopedia, a dictionary, maps, a movies database, etc.

A user at one of the client computer systems 18 accesses the user interface 12 over the internet 14B (step 36). The user can enter a search query in a search box in the user interface 12, and either hit "Enter" on a keyboard or select a "Search" button or a "Go" button of the user interface 12 (step 38). The search engine 28 then uses the "Search" query to parse the search databases 24 or the structured databases and data sources 26. In the example of where a "Web" search is conducted, the search engine 28 parses the search database 24 having general Internet Web data (step 40). Various technologies exist for comparing or using a search query to extract data from databases, as will be understood by a person skilled in the art.

The search engine 28 then transmits the extracted data over the internet 14B to the client computer system 18 (step 42). The extracted data typically includes URL links to one or more of the remote sites 20. The user at the client computer system 18 can select one of the links to the remote sites 20 and access the respective remote site 20 over the internet 14C (step 44). The server computer system 16 has thus assisted the user at the respective client computer system 18 to find or select one of the remote sites 20 that have data pertaining to the query entered by the user.

Figure 3:
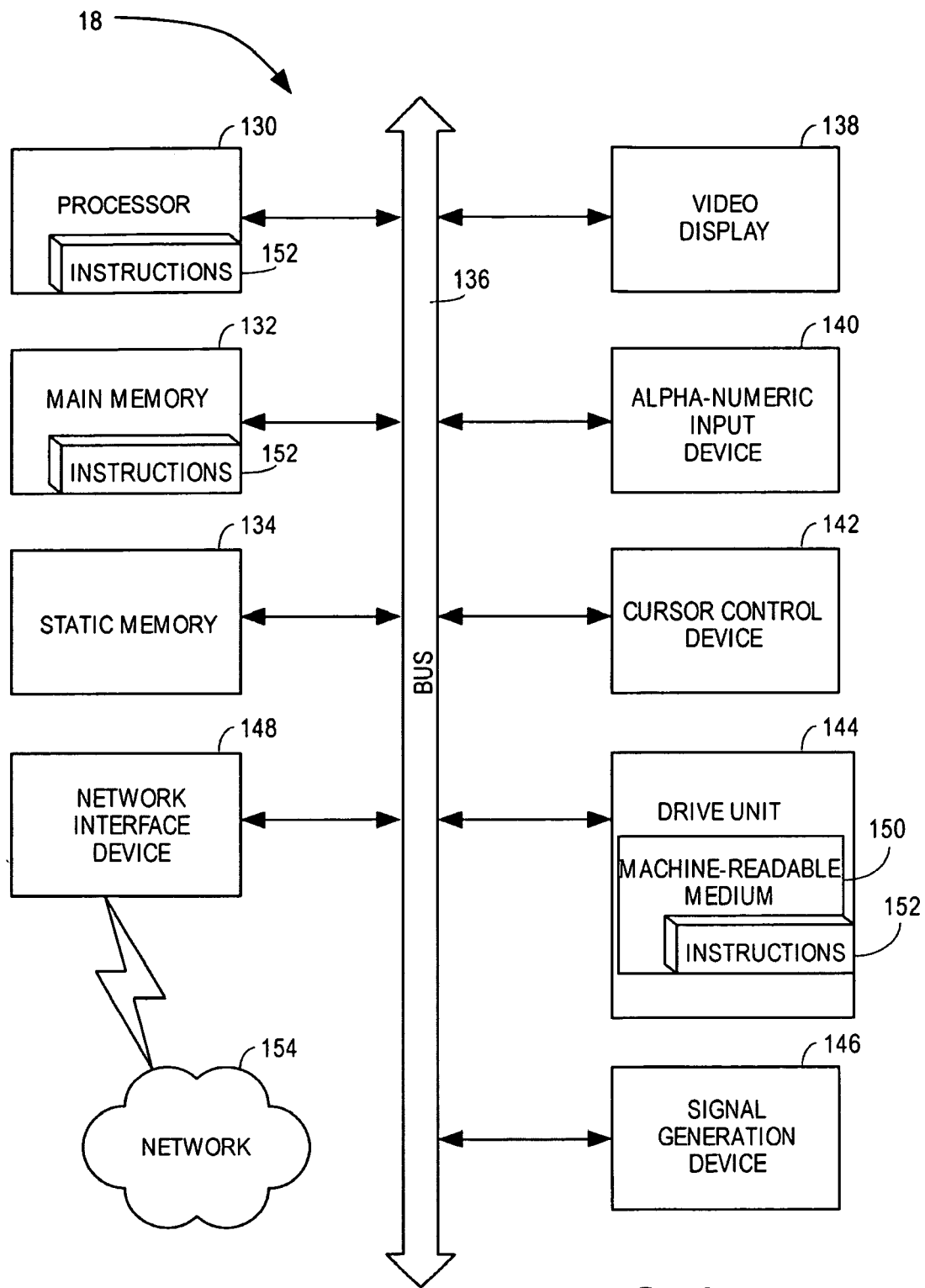
FIG. 3 is a block diagram of a client computer system forming an area of the network environment, but may also be a block diagram of a computer in a server computer system forming area of the network environment.

FIG. 3 shows a diagrammatic representation of a machine in the exemplary form of one of the client computer systems 18 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The server computer system 16 of FIG. 1 may also include one or more machines as shown in FIG. 3.

The exemplary client computer system 18 includes a processor 130 (e.g., a central processing unit (CPU), a graphics processing unit (GPU), or both), a main memory 132 (e.g., read-only memory (ROM), flash memory, dynamic random access memory (DRAM) such as synchronous DRAM (SDRAM) or Rambus DRAM (RDRAM), etc.), and a static memory 134 (e.g., flash memory, static random access memory (SRAM), etc.), which communicate with each other via a bus 136.

The client computer system 18 may further include a video display 138 (e.g., a liquid crystal display (LCD) or a cathode ray tube (CRT)). The client computer system 18 also includes an alpha-numeric input device 140 (e.g., a keyboard), a cursor control device 142 (e.g., a mouse), a disk drive unit 144, a signal generation device 146 (e.g., a speaker), and a network interface device 148.

The disk drive unit 144 includes a machine-readable medium 150 on which is stored one or more sets of instructions 152 (e.g., software) embodying any one or more of the methodologies or functions described herein. The software may also reside, completely or at least partially, within the main memory 132 and/or within the processor 130 during execution thereof by the client computer system 18, the memory 132 and the processor 130 also constituting machine readable media. The software may further be transmitted or received over a network 154 via the network interface device 148.

While the instructions 152 are shown in an exemplary embodiment to be on a single medium, the term "machine-readable medium" should be taken to understand a single medium or multiple media (e.g., a centralized or distributed database or data source and/or associated caches and servers) that store the one or more sets of instructions. The term "machine-readable medium" shall also be taken to include any medium that is capable of storing, encoding, or carrying a set of instructions for execution by the machine and that caused the machine to perform any one or more of the methodologies of the present invention. The term "machine-readable medium" shall accordingly be taken to include, but not be limited to, solid-state memories and optical and magnetic media.

Query-to-Pick and Pick-to-Query Correlation

Figure 4:
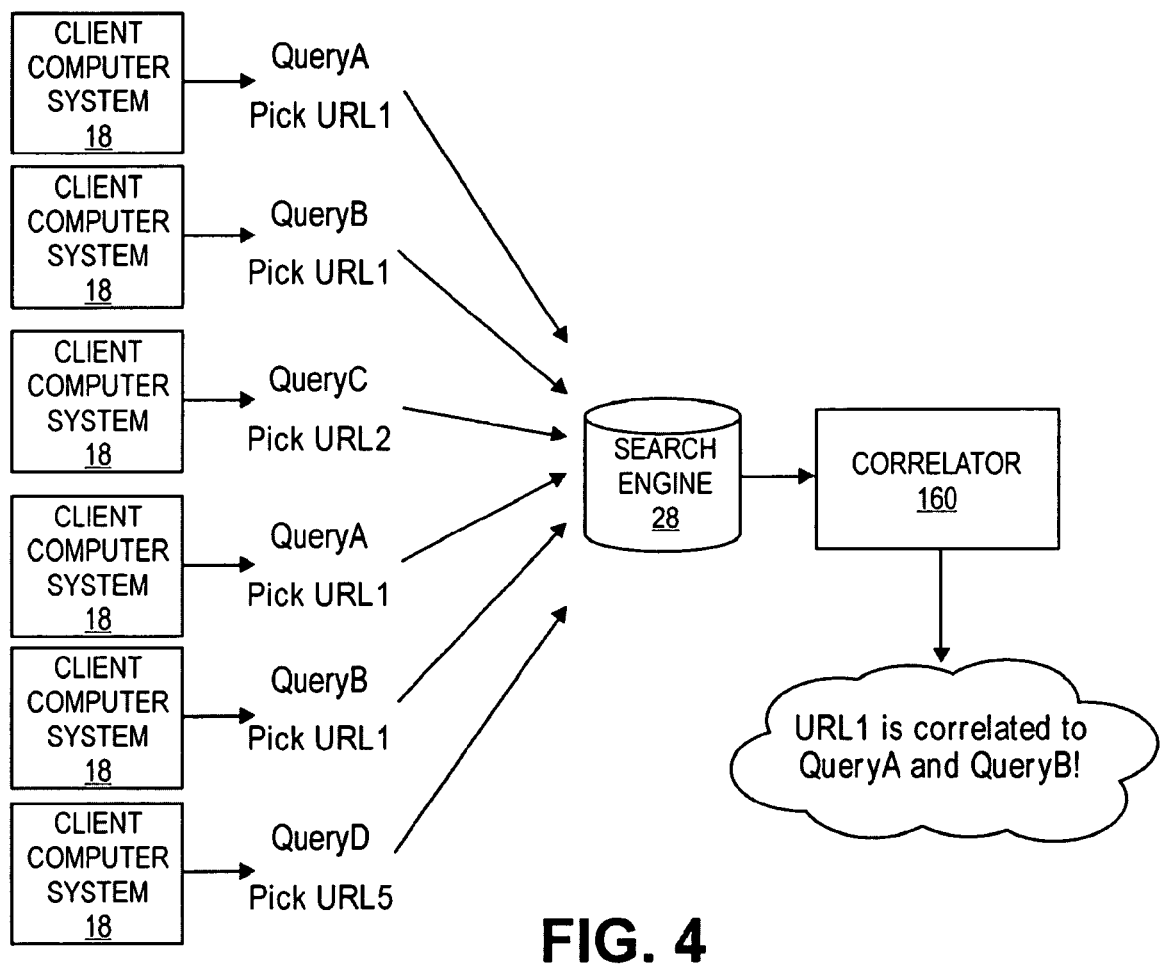
FIG. 4 is a block diagram illustrating a Query-to-Pick and Pick-to-Query correlation.

FIG. 4 illustrates how queries and picks are associated with one another with the use of a correlator 160 connected to the search engine 28. A query-to-pick (Q2P) correlation associates a query with a pick. When multiple independent users make the same association, that is a correlation candidate. When the search engine 28 returns a result in response to a query and a user picks that result, this is a special case of such a correlation (Q2RP). In effect, the search engine algorithm replaces a second independent user. In accordance with one embodiment of the invention, the Q2P correlation associates a query with all picks in a user session. This is in contrast to prior art schemes that terminated association of a given query with picks upon issuance of a subsequent query.

With Q2P, all picks recorded during a user session are associated with a given query issued during that user session. For one embodiment, a score is assigned to each association, based upon various factors, including the time between query and pick, the number of intervening queries and/or picks, and the order of queries with respect to picks.

In addition, each association's score can be adjusted based upon well-known factors, including rank of the pick in the result list at the time of association, duration of the pick (interval until next known user action), age or order of the association (relative to older or newer associations), and age of the first known instance of association.

Each user session can be of infinite duration. In a practical application, a reasonable time limit, or limit on intervening actions, should be imposed beyond which no relationship between picks and queries will be assigned. Alternatively or additionally, an interruption of sufficient duration can indicate a break in sessions. A search log excerpt, in accordance with one embodiment of the invention, is shown below as Table 1. In various alternative embodiments, any other items could be captured in the search log, but are excluded here for clarity:

TABLE 1

| Row | Timestamp | User ID | Query | Pick (URL) |
|---|---|---|---|---|
| 101 | 1/1/03 00:00:00 | U1 | Q1 | P5 |
| 102 | 1/1/03 00:01:00 | | Q2 | P1 |
| 103 | 1/1/03 00:02:00 | | | P2 |
| 104 | 1/1/03 00:02:05 | | | P3 |
| 201 | 1/2/03 00:00:00 | U2 | Q2 | P4 |
| 202 | 1/2/03 00:01:00 | | | P1 |
| 203 | 1/2/03 00:02:00 | | | P4 |
| 204 | 1/2/03 00:04:00 | | Q1 | P2 |
| 205 | 1/2/03 00:04:05 | | | P3 |
| 301 | 1/3/03 00:00:00 | U3 | Q3 | P3 |
| 302 | 1/3/03 00:04:00 | | Q2 | P1 |
| 303 | 1/3/03 02:00:00 | | Q3 | P5 |
| 401 | 1/4/03 00:00:00 | U2 | Q1 | * |
| 402 | 1/4/03 00:06:00 | | Q2 | P4 |

(*= query with no associated pick)

Table 1A illustrates a tabulation of the click information contained in Table 1 in accordance with an embodiment of the invention. For comparison, Table 1B illustrates a tabulation of the click information contained in Table 1 in accordance with a typical prior art scheme employing a Q2RP correlation:

TABLE 1A (Q2P Results)

| | Q1 | Q2 | Q3 |
|---|---|---|---|
| P1 | 2 | 3 | 1 |
| P2 | 1 | 1 | — |
| P3 | 2 | 3 | 1 |
| P4 | 1 | 1 | — |
| P5 | 1 | 2 | 1 |

TABLE 1B (Q2RP Results of Prior Art)

| | Q1 | Q2 | Q3 |
|---|---|---|---|
| P1 | — | 3 | — |
| P2 | 1 | — | — |
| P3 | 1 | 1 | 1 |
| P4 | — | 2 | — |
| P5 | 1 | — | 1 |

Due to the fact that numerous factors can vary or penalize the scores, we will assume 1 pick=a score increment of +1, except for the following penalization situations, where we will assume the pick represents a score increment of 0. Assuming a time threshold, the click in row 103 is penalized in both tabulations due to the user spending a very short time at the URL. Assuming daily database batch updates, the click in row 203 would typically be penalized by the prior art tabulation of Table 1B as a duplicate of click 201. The clicks in rows 203 and 402 are penalized by the tabulation, in accordance with an embodiment of the invention, as duplicates of click 201.

For Query Q1, URL P1, which was never clicked immediately subsequent to Q1, has garnered a high score in the tabulation, in accordance with an embodiment of the invention, because multiple users chose it before or after—though not immediately after—issuing Query Q1. The whole matrix of scores for the tabulation, in accordance with an embodiment of the invention, is richer, as many more associations are noted. Some scores, such as that for Q2P4, are lower, due to the retention of session data indicating that all the clicks came from a single user, permitting the identification of more duplicates.

In practical applications of Q2P, we can retain the distinction as to whether a particular association was Q2RP or non-Q2RP. A single, uncorrelated non-Q2RP click (such as Q3P1 in the table) may not inspire enough confidence to release the result to users, whereas for a single, uncorrelated Q2RP click, the association is reinforced by the fact that the search engine presented the result for the original search.

A pick-to-query (P2Q) correlation associates all queries recorded during a user session that are correlated with a given pick issued during that user session. The search log excerpt of Table 1 illustrates the output of P2Q correlation. That is, the same data generated for Q2P can be re-indexed for P2Q.

Further details of Q2P and P2Q are described in U.S. Pat. No. 7,181,447, which is incorporated herein by reference in its entirety.

Classifier Learning Phase

Figure 5:
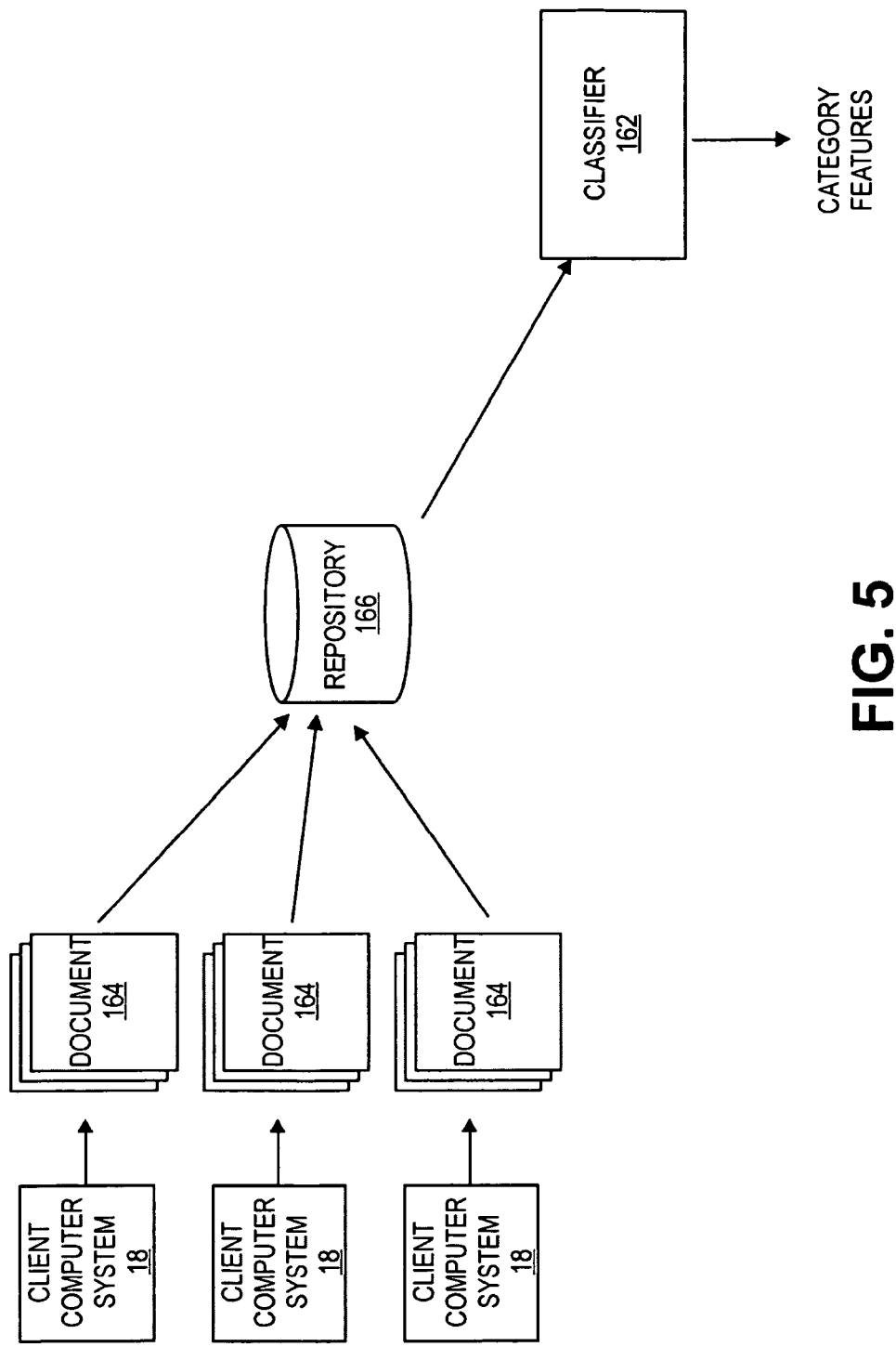
FIG. 5 is a block diagram illustrating a classifier learning phase.

FIG. 5 shows the learning phase of a classifier 162. For each category, editors collect a large number of related documents 164 and store the documents in a repository 166. The classifier 162 reads the related documents 164 and learns to recognize their important features. Important features may, for example, be identified when a particular word appears in a large percentage of the documents 164 for a particular category.

Query-to-Query Correlation

Figure 6:
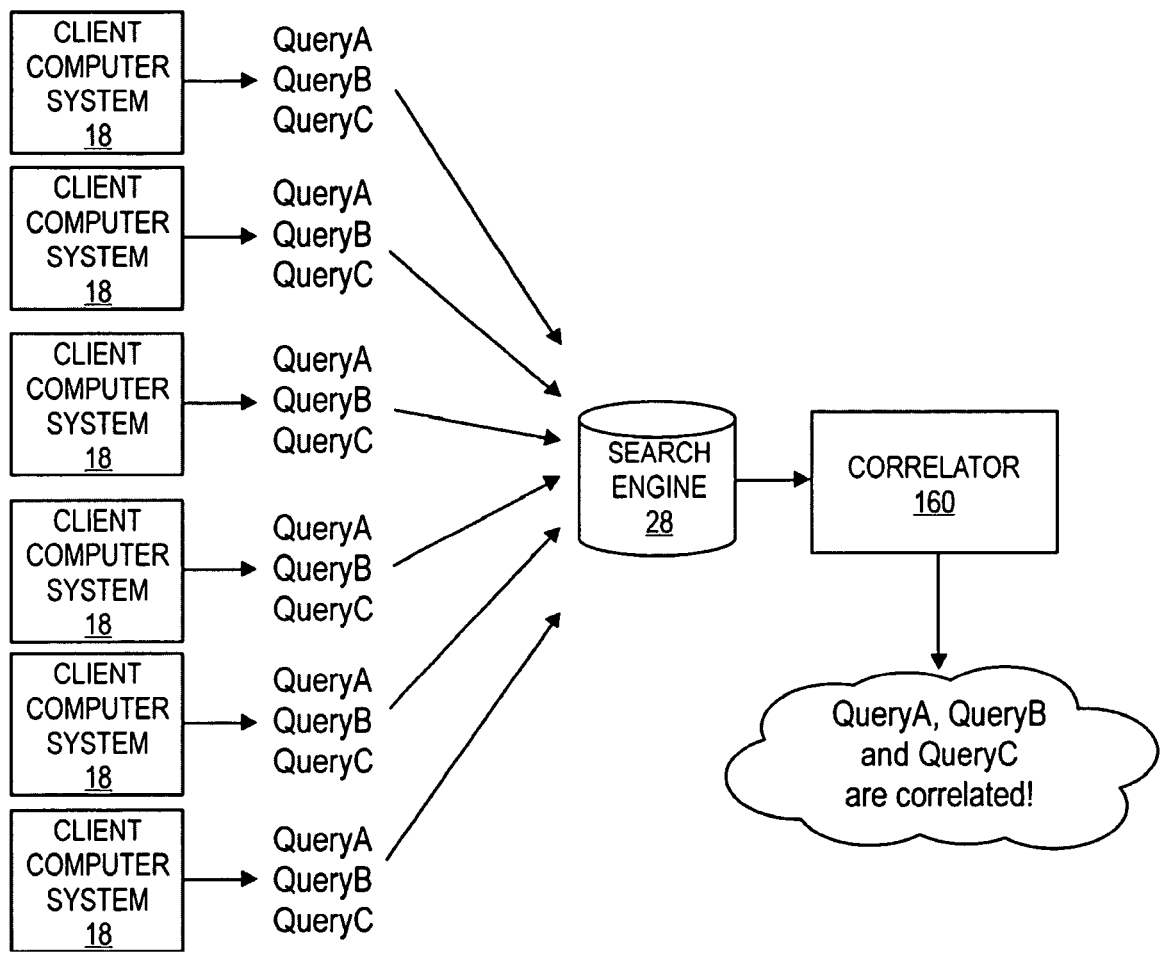
FIG. 6 is a block diagram illustrating a Query-to-Query correlation.

FIG. 6 illustrates how queries and queries are associated with one another with the use of the same correlator 160 connected to the search engine 28. A query-to-query (Q2Q) correlation associates all queries issued during a user session with all other queries issued during that session. For one embodiment, a score may be assigned to each association based upon various factors, including the time between queries, the number of intervening queries and/or picks, age or order of the association (relative to older or newer associations), whether or not the query results generated picks, and the pair-wise order of the associated queries, among others.

Determining if the query results generated picks, as well as the pair-wise order of the associated queries, can be particularly informative, as they can indicate whether one query is a "correction" of another. For any practical application, it is useful to know which of two associated queries is an error, and which is a correction.

A search log excerpt, in accordance with one embodiment of the invention, is shown below as Table 2. Only the query portion of the search log is required to create a Q2Q table:

TABLE 2

| Row | Timestamp | User ID | Query |
|---|---|---|---|
| 101 | 1/1/03 00:00:00 | U1 | Q1 |
| 102 | 1/1/03 00:01:00 | | Q2 |
| 103 | 1/1/03 00:02:00 | | |
| 104 | 1/1/03 00:02:05 | | |
| 201 | 1/2/03 00:00:00 | U2 | Q2 |
| 202 | 1/2/03 00:01:00 | | |
| 203 | 1/2/03 00:02:00 | | |
| 204 | 1/2/03 00:04:00 | | Q1 |
| 205 | 1/2/03 00:04:05 | | |
| 301 | 1/3/03 00:00:00 | U3 | Q3 |
| 302 | 1/3/03 00:04:00 | | Q2 |
| 303 | 1/3/03 02:00:00 | | Q3 |
| 401 | 1/4/03 00:00:00 | U2 | Q1 |
| 402 | 1/4/03 00:06:00 | | Q2 |

Table 2A illustrates a tabulation of the click information contained in Table 2 in accordance with an embodiment of the invention (assuming the order of queries issued is ignored):

TABLE 2A

| | (Q2Q Results) | | |
|---|---|---|---|
| | Q1 | Q2 | Q3 |
| Q1 | — | 2 | — |
| Q2 | — | — | 1 |
| Q3 | — | — | — |

The lower triangular area of Table 2A can be used to retain the pair-wise query order information, avoiding double-booking cases like rows 301-303.

As noted above, a scoring scheme may be employed in which numerous factors can vary or penalize the score. For example, duplicates (e.g., association in rows 101 and 102 and associations made in rows 401 and 402) could be penalized. Or, for example, an uncorrelated Q2Q association, like Q2Q3, would not inspire enough confidence to release the result to users.

URL (Answer) Categorization

Figure 7:
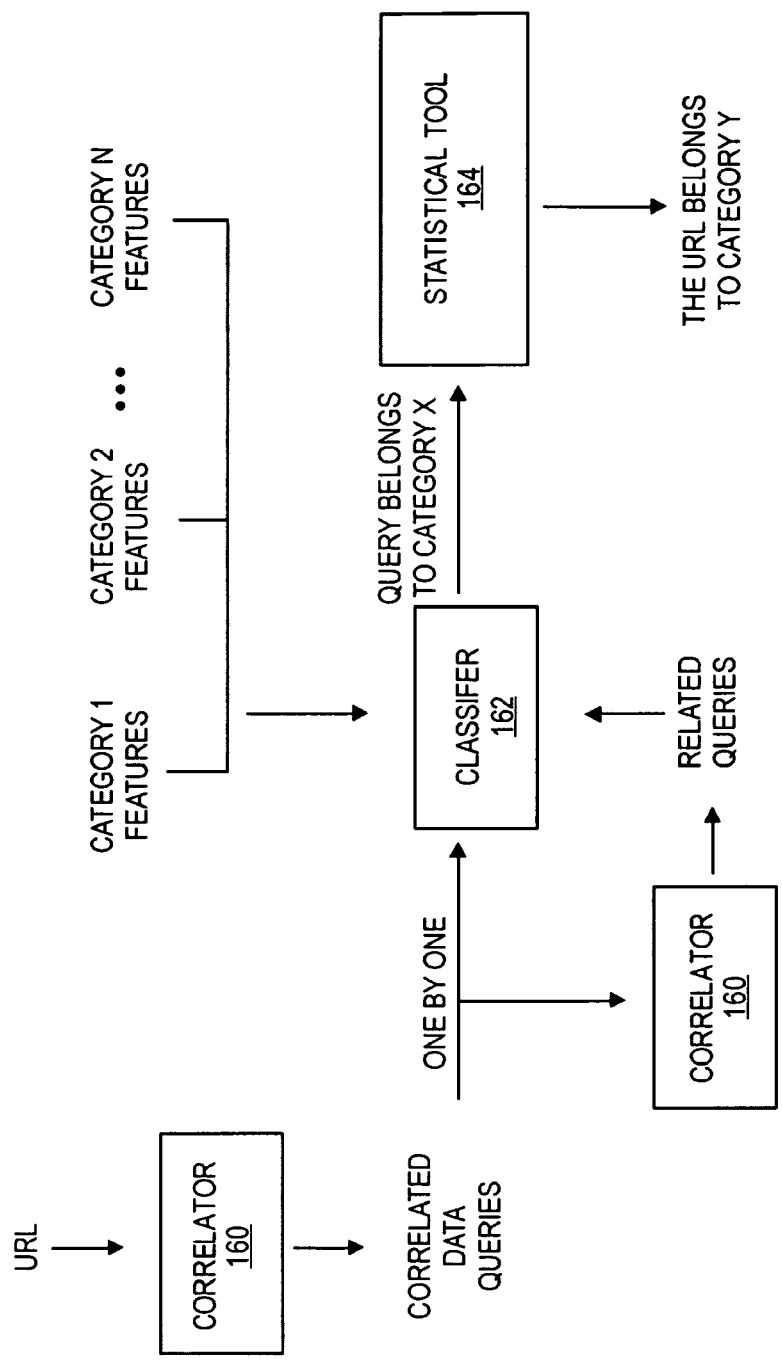
FIG. 7 is a block diagram illustrating a URL (Answer) classification.

FIG. 7 illustrates categorization of a plurality of answers in the form of URLs of the search database 24 in FIG. 1 stored in the memory 132 in FIG. 3.

The same correlator 160 used in FIG. 4 utilizes each URL to extract a plurality of data queries using P2Q as described with reference to FIG. 4 corresponding to the URL. The same correlator 160 then utilizes each data query to extract a plurality of related queries corresponding to the respective data query using Q2Q as described with reference to FIG. 6.

The classifier 162 then matches the data query and each one of the related queries with a respective category utilizing the features identified for each category. A statistical tool 164 is then used to extract the most likely category among all the categories utilizing interpolation of the categories. The classifier thus matches each one of the URLs with a category among a plurality of categories.

Table 3 illustrates a P2Q correlation and classification for the URL http://www.apple.com/itunes/:

TABLE 3

| Query | Classification |
|---|---|
| ipod nano | Consumer_Electronics # 86% >> MP3_Players # 89% |
| itunes | Consumer_Electronics # 0% >> MP3_Players # 0% |
| itunes music store | Consumer_Electronics # 53% >> MP3_Players # 62% |
| apple itunes download | Consumer_Electronics # 68% >> MP3_Players # 93% |
| itunes | Consumer_Electronics # 20% >> MP3_Players # 18% |
| itunes help | Consumer_Electronics # 19% >> MP3_Players # 66% |
| apple itunes | Consumer_Electronics # 62% >> MP3_Players # 90% |
| burn cds off internet for free | Computers # 14% >> Software # 9% |
| free downloads itunes | Computers # 22% >> Software # 8% |
| what is itunes | Consumer_Electronics # 0% >> MP3_Players # 0% |
| itunes store | Consumer_Electronics # 46% >> MP3_Players # 49% |
| what are itunes | Consumer_Electronics # 0% >> MP3_Players # 0% |

The statistical tool 164 has thus classified each one of the correlated queries according to a degree of confidence.

The statistical tool 164 then proceeds to determine the most relevant category or categories among the categories in Table 3. In the present example, the most relevant categories are as follows:

Level 1: Consumer_Electronics (3.54), Computers (0.36);
Level 2: Consumer_Electronics/MP3_Players (2.67), Computers/Software (0.03).

Query Classification

Figure 8:
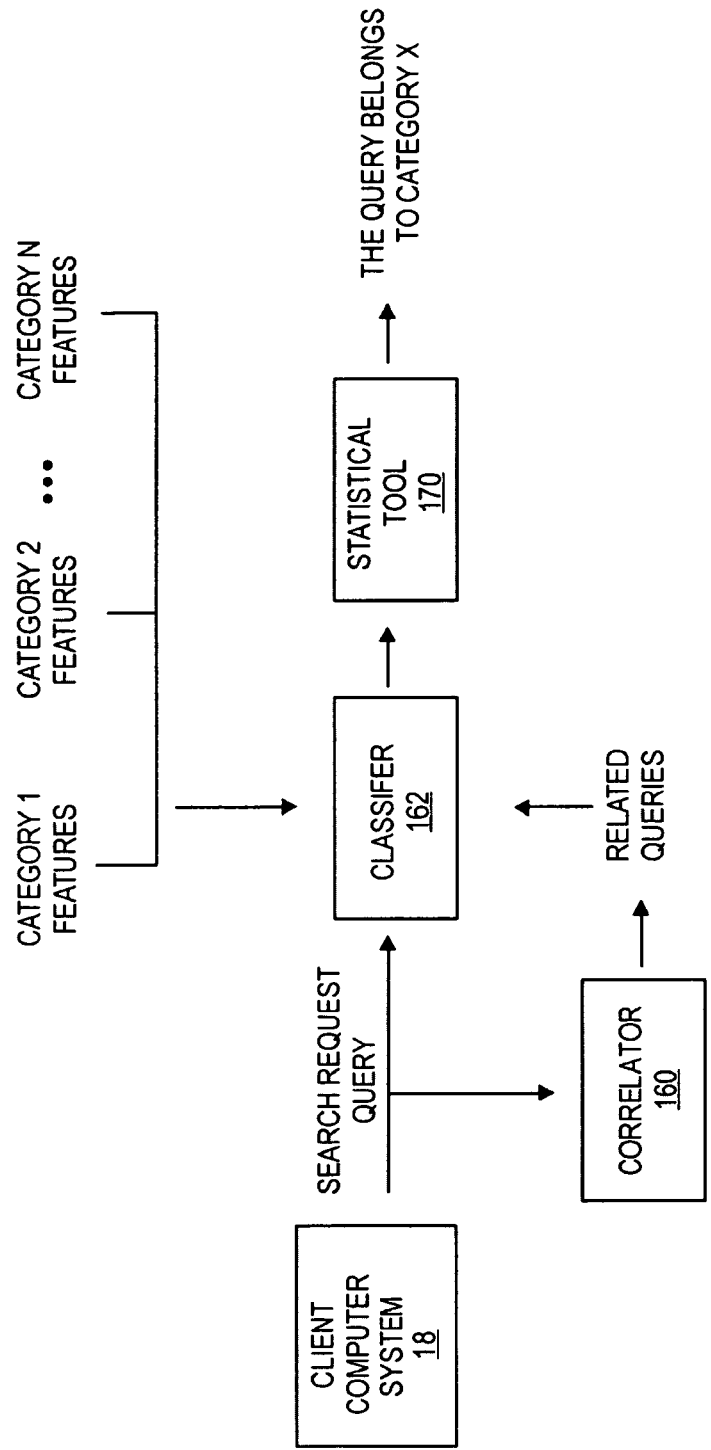
FIG. 8 is a block diagram illustrating a query classification.

FIG. 8 illustrates categorization of a plurality of a search request received at the client computer system 18. FIG. 4, FIG. 5, FIG. 6, and FIG. 7 are carried out ahead of time, and FIG. 8 is carried out almost in real time when a search request is received.

The same correlator 160 utilizes the search request to extract a plurality of related queries using Q2Q as described with reference to FIG. 7 corresponding to the search request. The classifier 160 then matches the search request and each one of the related queries with a respective category utilizing the features identified for each category. A statistical tool 170 is then used to extract the most likely category among all the categories utilizing a stochastic method. The classifier thus matches the search request with a category among a plurality of categories.

Search Results Based on Classification

Search results are generated as hereinbefore described with a reference to FIG. 2. The search results include a plurality of URLs. The most relevant category for the query is used to provide URLs that are primarily in the same category as the query.

Figure 9:
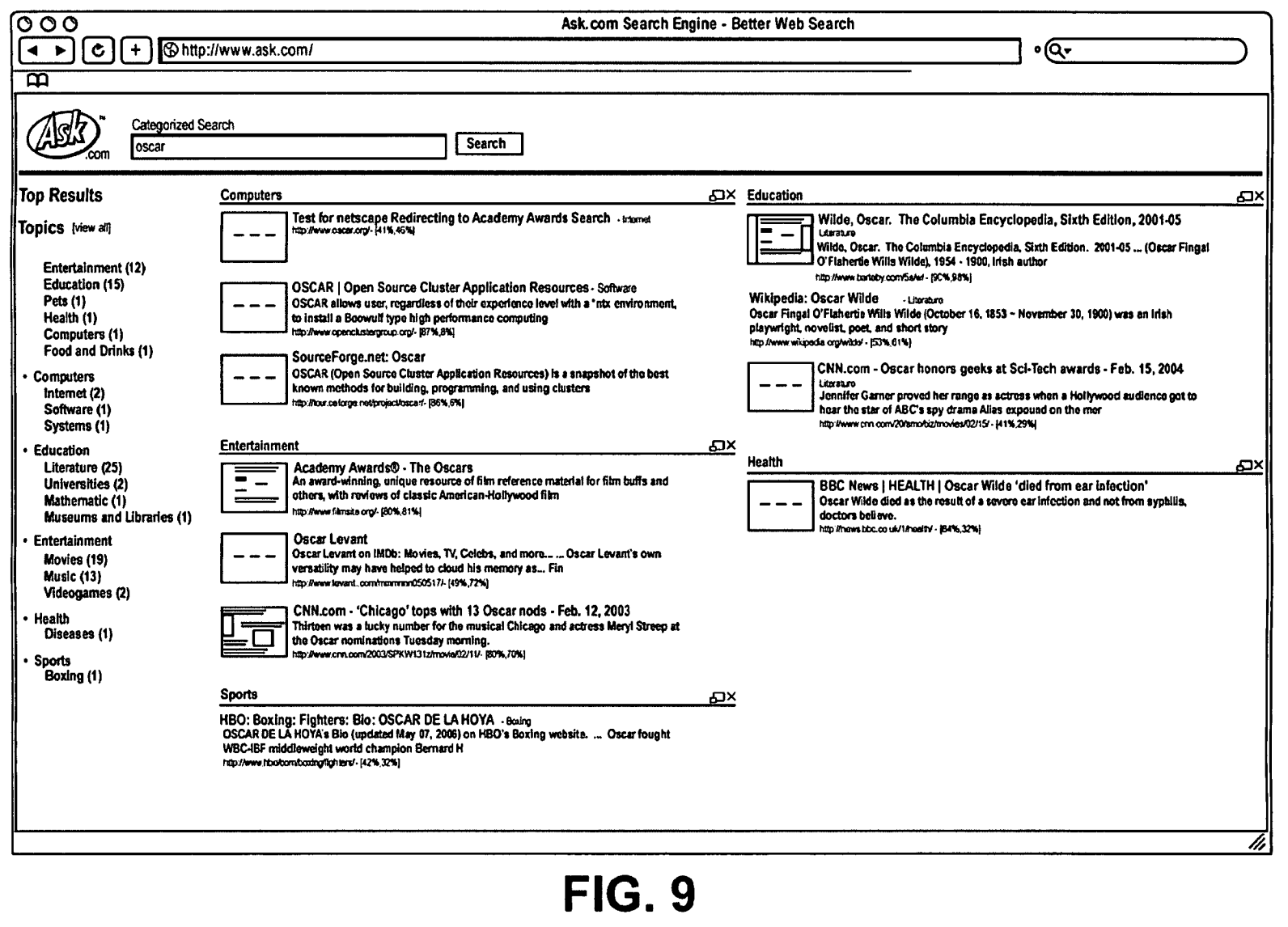

FIG. 9 illustrates search results for the search request ("oscar"). In this example, a Q2Q categorization has determined that the search request is primarily for computers, entertainment, or education, and secondarily, perhaps, for health and sports. As such, URLs in the categories "computer," "education," and "entertainment" are primarily provided, followed by "health" and "sports." A browser is used to display a user interface that includes the search results. The browser 160 may, for example, be an Internet Explorer™, Firefox™, Netscape™, or any other browser. The browser has an address box, a viewing pane 166, and various buttons such as back and forward buttons. The browser is loaded on a computer at the client computer system 18 of FIG. 1. A user at the client computer system 18 can load the browser into memory, so that the browser is displayed on a screen such as the video display 138 in FIG. 3.

Figure 9A:
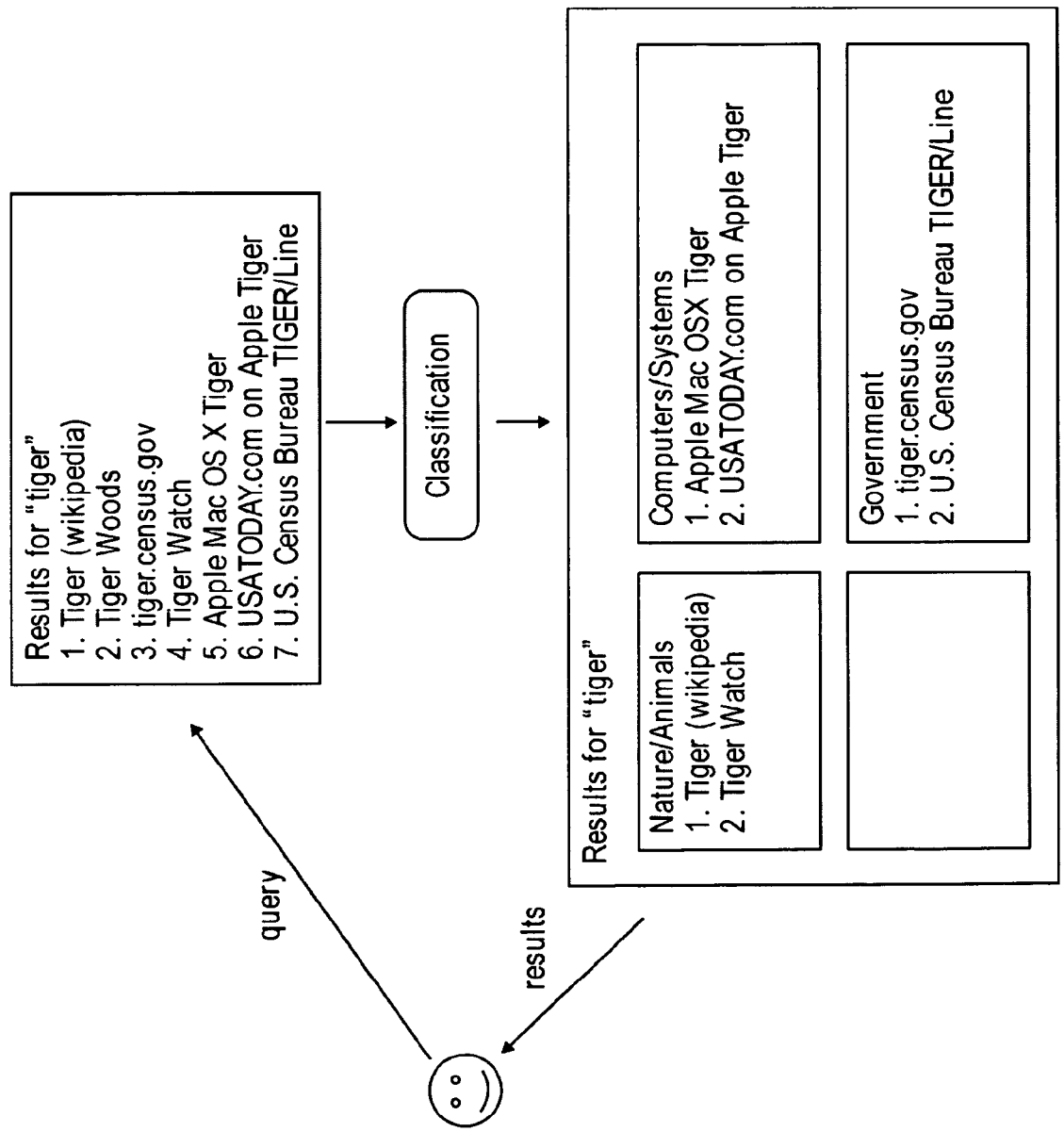
FIG. 9A illustrates that answers for different categories are located at different physical areas on a results page.

As better illustrated in FIG. 9A, different categories are placed at different physical locations. Search results are also separately ranked within the physical area of each category.

Figure 10:
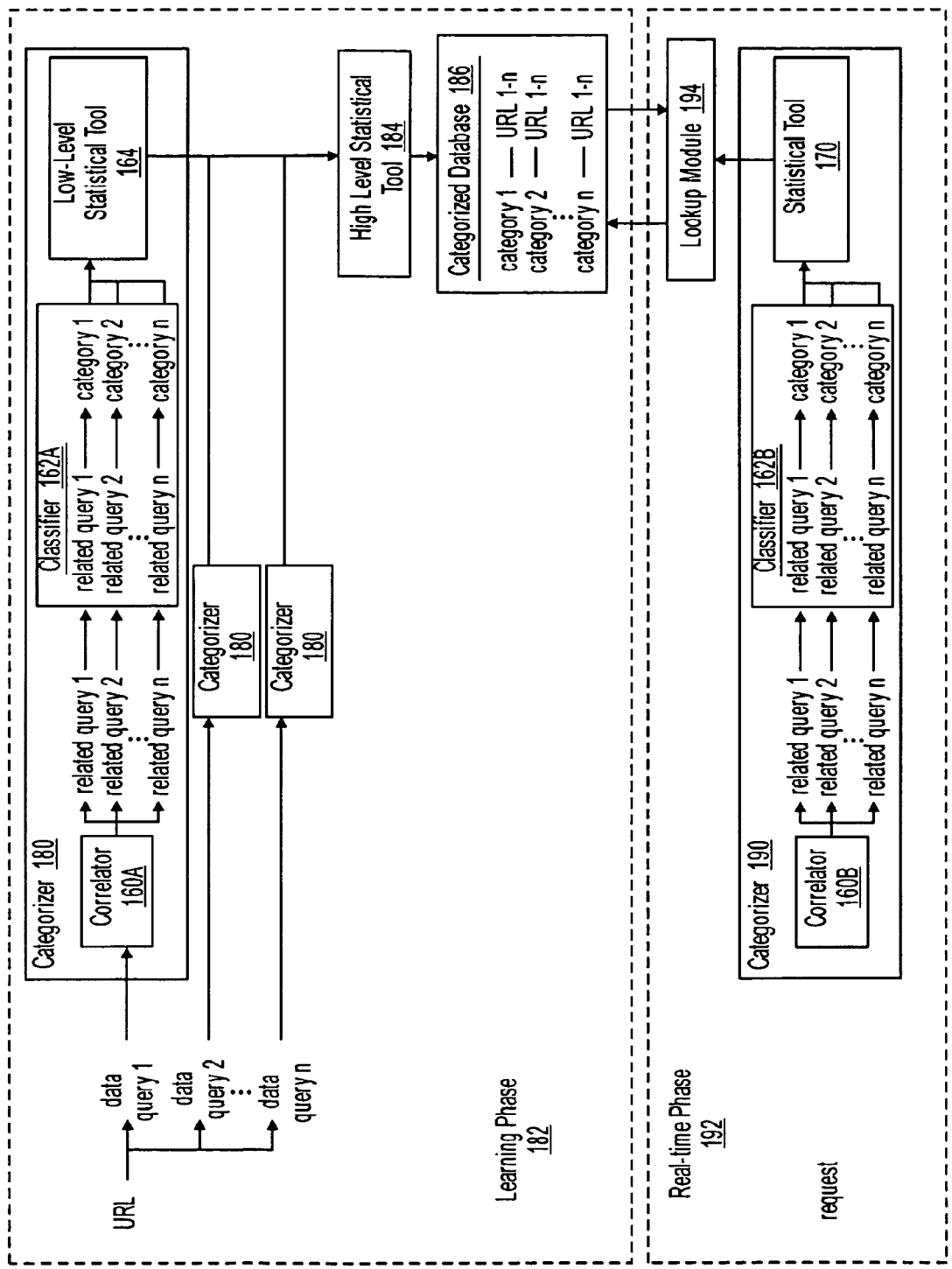
FIG. 10 is a block diagram illustrating integration of the subsystems of FIGS. 7 and 8.

In FIG. 10, the same correlator is indicated with reference numerals 160A and 160B, and the same classifier is indicated with reference numerals 162A and 162B. The correlator 160A, classifier 162A, and the statistical tool 164 form part of a categorizer 180 in a learning phase 182 of the system. The same categorizer 180 is used a plurality of times. The statistical tool 164 is a low-level statistical tool 164. A high-level statistical tool 184 is used to combine the data from the multiple uses of the categorizer 180. An output from the high-level statistical tool 184 is used to develop a categorized database 186.

The correlator 160B, classifier 162B, and the statistical tool 170 form another categorizer 190 in a real-time phase 192 of the system. The real-time phase 192 also includes a look-up module 194 that retrieves categories from the categorized database 186 based on an output of the statistical tool 170.

The categorizer 180 in the learning phase 182 is thus the same as in FIG. 7. The categorizer 190 in the real-time phase 192 is the same as in FIG. 8.

Figure 11:
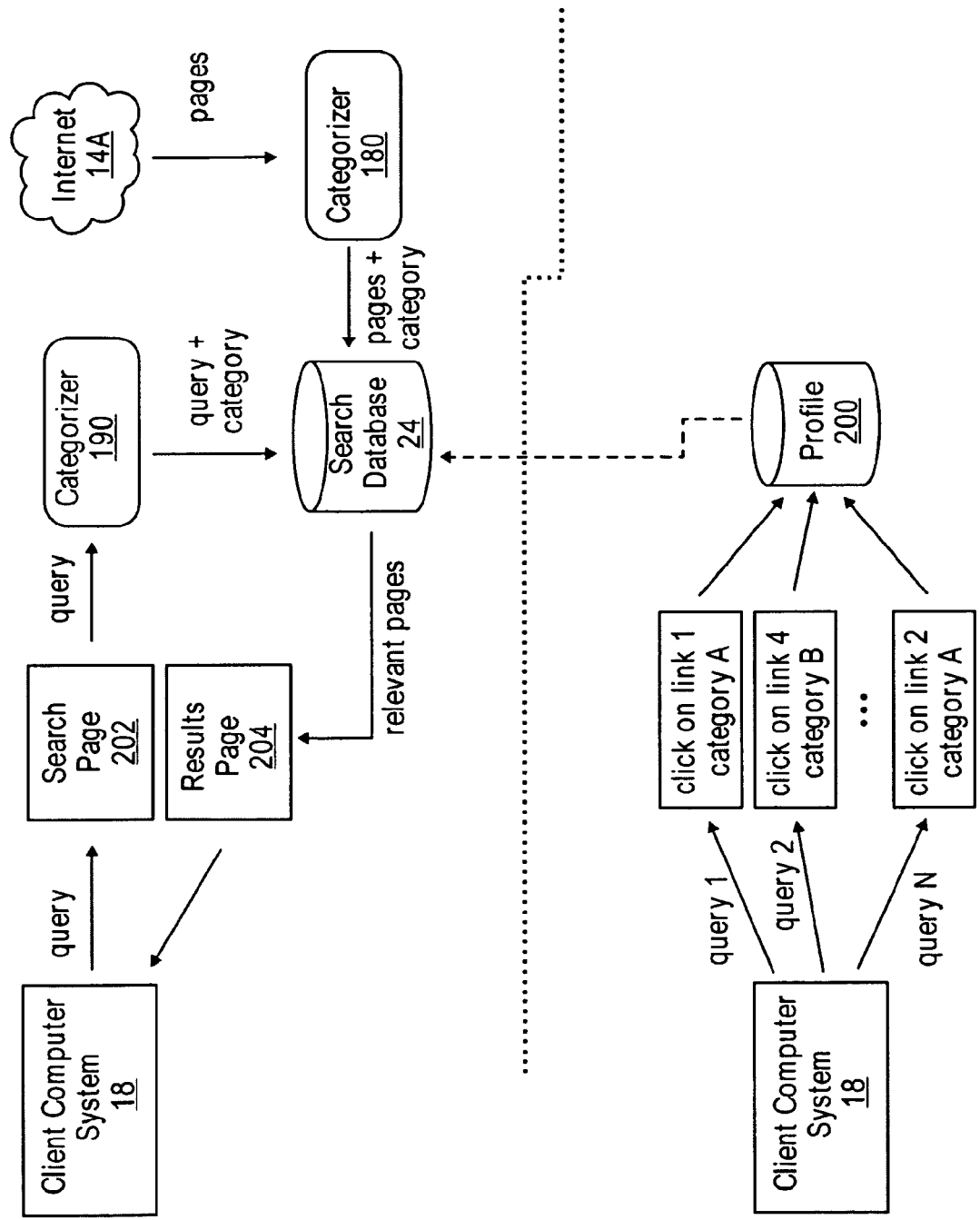
FIG. 11 is a block diagram illustrating how a profile of a client computer system can be used to further improve search results.

As shown in FIG. 11, a profile 200 for a client computer system 18 is established. The profile 200 is based on queries that are received from the client computer system 18 (Query 1, Query 2 . . . Query N) and selections that are made (e.g., click on link 4, category B). When the same client computer system 18 is used to submit a query on a search page 202, and the query is categorized in the categorizer 190, multiple factors are used to determine relevant pages for a results page 204. The factors that are taken into account for the results page 204 include the query and category from the categorizer 190, relevant pages and categories from the categorizer 180 received over the internet 14A, and the profile 200 of the client computer system 18. Certain pages may, for example, be ranked higher than other pages, than when the profile 200 is not used for ranking the pages.

Figure 12:
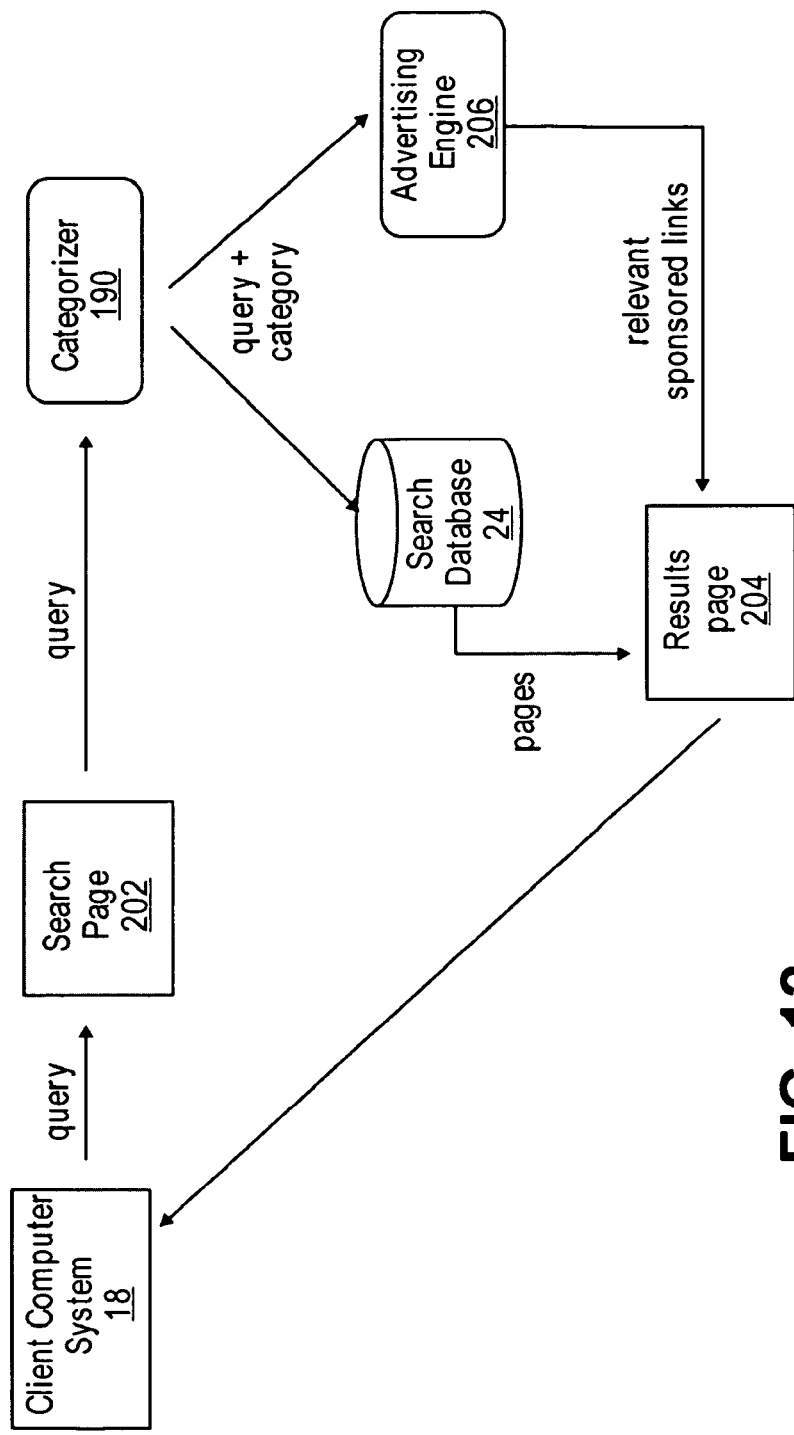
FIG. 12 is a diagram illustrating how an advertising engine utilizes categories to select an advertisement or advertisements.

As shown in FIG. 12, following entry of a query in a search page and categorization by the categorizer 190, an advertising engine 206 utilizes the query and the category to extract an advertisement or advertisements from a plurality of advertisements. The advertisement or advertisements that are selected utilizing the category are different than advertisements that are selected without using the category. The same query and category are used to extract relevant pages from a search database 24. The relevant pages and selected advertisements are provided together on the results page 204. The results page 204 is then transmitted back to the client computer system 18.

Figure 13:
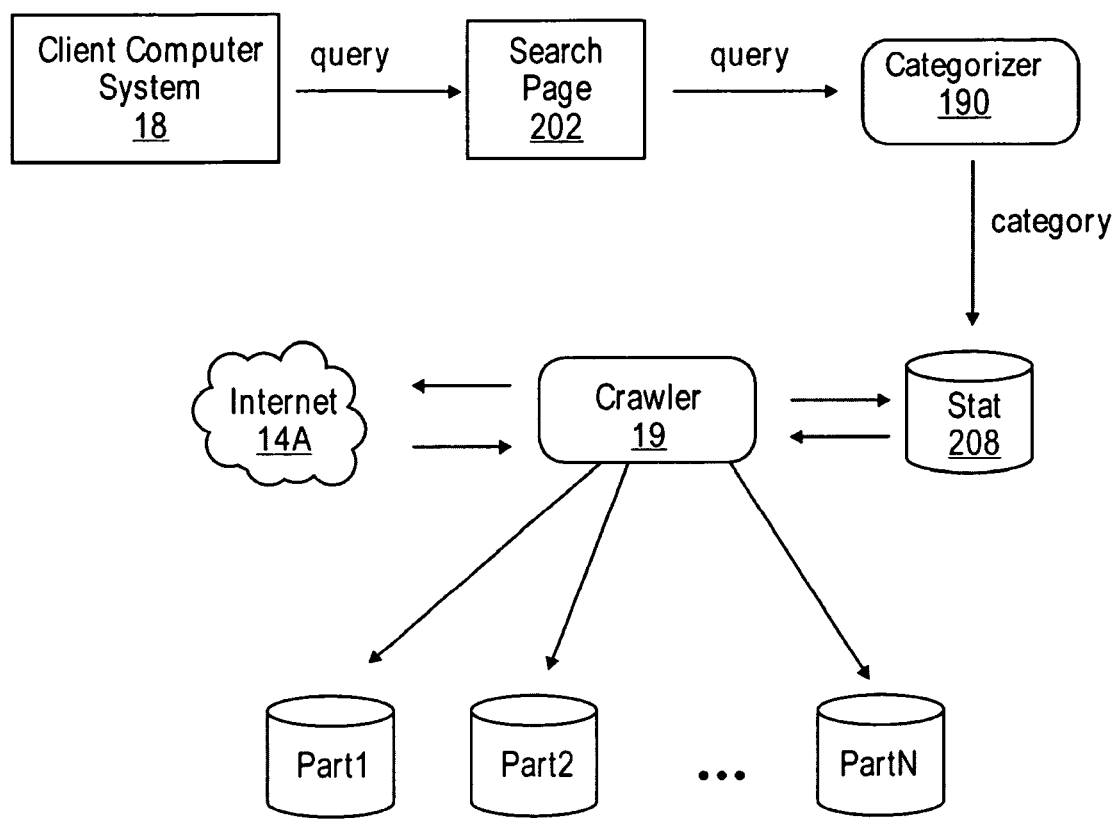
FIG. 13 is a block diagram illustrating how a crawler can make use of categories to download certain answers at a higher rate, and can make use of the categories to store the answers in different categories or partitions.

As further illustrated in FIG. 13, the crawler 19 can use a statistical tool 208 to determine which categories are searched the most by users. The crawler 19 utilizes the statistics provided by the statistical tool 208 to download web pages belonging to certain categories more frequently than web pages belonging to other categories. The categories that are downloaded more often are typically the ones that are searched more often by users. A spam category can also be created, and downloads of web pages belonging to the spam category can be avoided or be totally eliminated.

The crawler 19 can also store the downloaded pages in separate categories, even separate partitions (Part1, Part2 . . . Part N). By storing the web pages in separate categories, retrieval speed can be increased.

Figure 14:
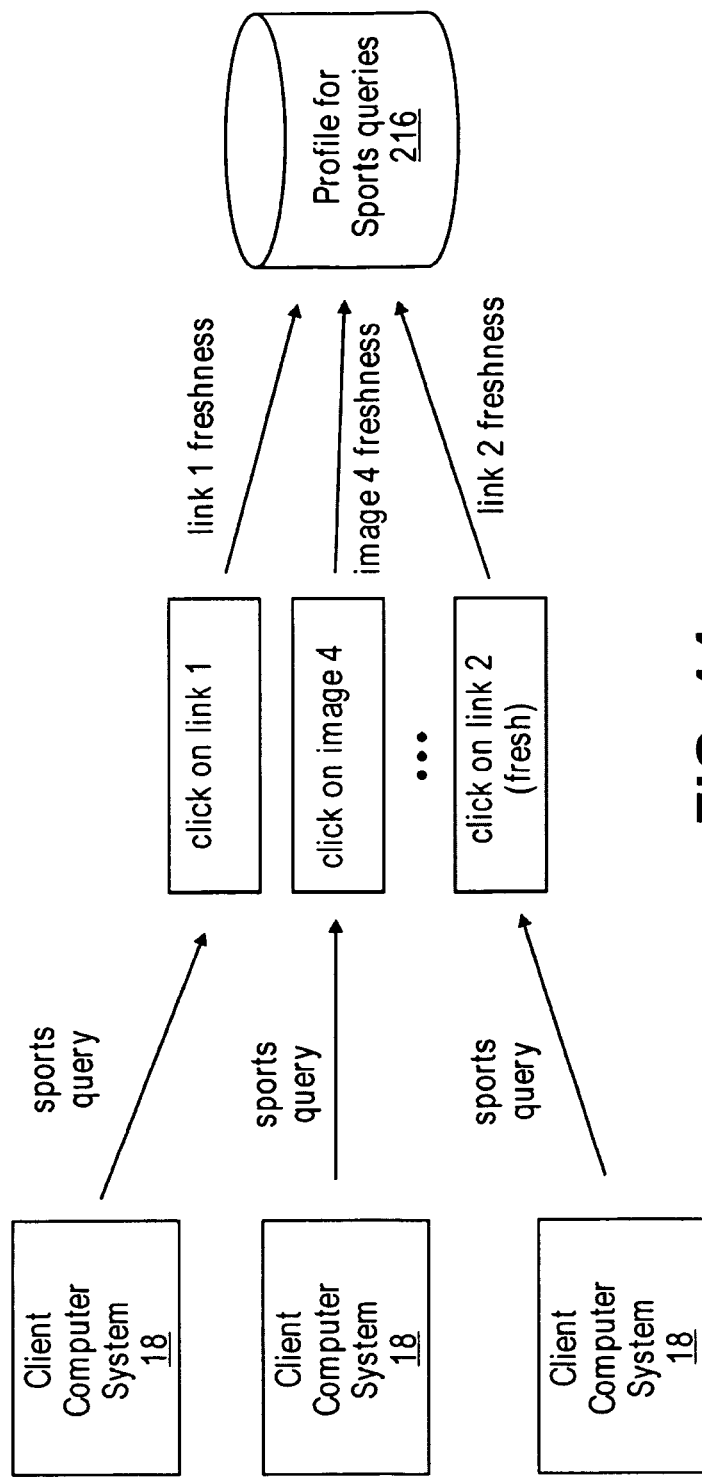
FIG. 14 is a block diagram illustrating how a profile is created for each category.

FIG. 14 illustrates that a profile 216 is created for each category. In the present example, the profile 216 is a profile for sports queries. A separate profile (not shown) is created for each category. Queries are received from different client computer systems 18, and are categorized as "sports queries," as hereinbefore described. Results are also returned to the client computer systems 18. Users at the client computer systems 18 then select answers from the results. The answers may be links to web pages, images, video, or other media types. The answers also differ in their freshness. The profile 216 that is built reflects the media types that are most frequently selected for the particular category "sports queries," and also reflects the freshness of the answers that are more frequently selected. In the present example, the profile 216 for "sports queries" may reflect that users typically select fresher content, i.e., content within the last week as opposed to content that is more than ten years old. The profile 216 may also reflect that users select web pages approximately 40% of the time, images approximately 30% of the time, and videos approximately 30% of the time. When results are provided to future users of client computer systems such as the client computer systems 18, web pages, images, and videos are provided to such client computer systems in the same ratio as reflected in the profile 216 for "sports queries."

Figure 15A:
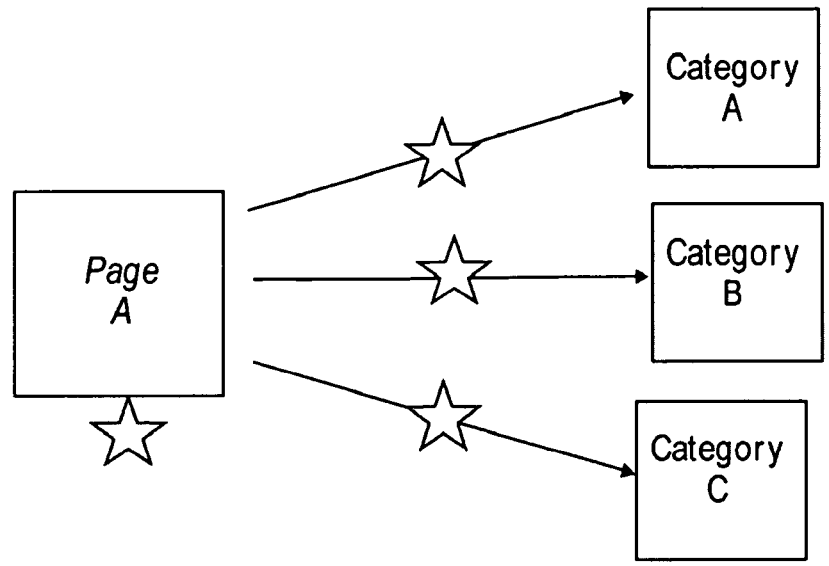
FIG. 15A illustrates how a page is ranked in different categories using traditional ranking as herein described.
Figure 15B:
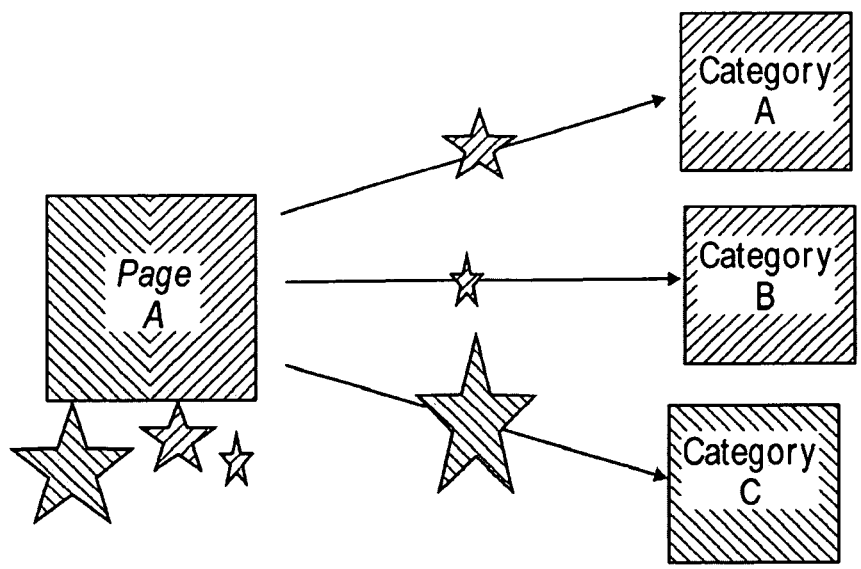
FIG. 15B illustrates how a page is ranked higher in some categories than in others, utilizing a modified ranking system as herein described.

As shown in FIG. 15A, traditional ranking of answers does not take into account the category of a web page or other answer. FIG. 15B illustrates that the scores of a page may differ, depending on the category. The same page A can, for example, belong to categories A, B, and C. When the page A is provided within category B, the page A would have a lower ranking than when the page A is provided in category C.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A computer system comprising:
   a memory;
   a plurality of answers stored in the memory;
   a correlator that, for each respective single answer, extracts a plurality of related queries corresponding to the respective single answer, at least two of the related queries corresponding to the respective single answer being different from one another;

a classifier that assigns a category to each of the related queries such that there are a plurality of categories assigned to the related queries corresponding to the respective single answer, wherein one of the plurality of categories is a spam category and answers in the spam category are not downloaded;

and a statistical tool that determines the relevance of the plurality of categories relative to one another and assigns at least one assigned category, of the categories assigned to the related queries corresponding to the respective single answer, to the respective single answer.

2. The computer system of claim 1, wherein at least one data query is extracted from each of the answers, the correlator matching the data query with the related queries.

3. The computer system of claim 1, wherein the answers are received over a network before storing the answers.

4. The computer system of claim 3, wherein answers for more frequently used categories are updated more often than answers for categories used less often.

5. The computer system of claim 3, further comprising: an indexer indexing the answers received over the network into indexed answers, the indexed answers being stored in the memory with each respective one answer having a respective assigned category associated therewith.

6. The computer system of claim 5, wherein the indexer indexes the answers into the categories.

7. The computer system of claim 1, further comprising: a search engine receiving a request from a client computer system at a server computer system and, in response to the request, transmitting a view from the server computer system to the client computer system for display at the client computer system, contents of the view being at least partially based on one selected category of the categories.

8. The computer system of claim 7, wherein the request is a search request, the classifier matching the request with a category among the plurality of categories and associating at least one of a plurality of answers with the request due to association of the request and the answer with the select category.

9. The computer system of claim 8, wherein the view includes different category areas, answers belonging to different categories being located in the respective category areas.

10. The computer system of claim 8, wherein the category is used to select the answer based on a media type of the answer.

11. The computer system of claim 8, wherein the category is used to select the answer based on a freshness of the answer.

12. The computer system of claim 8, further comprising a correlator extracting a related query corresponding to the request, wherein the classifier matches the request with a category by matching the related query to the category.

13. The computer system of claim 12, wherein the correlator matches the request to the category according to the method comprising: extracting a plurality of related queries corresponding to the request; and matching each related query to a category, further comprising: a statistical tool determining the relevance of each category.

14. The computer system of claim 8, wherein the search engine transmits a first view from a server computer system to the client computer system, the first view including a search identifier, the search engine receiving a search request from a client computer system at the server computer system and utilizing the search request at the server computer system to extract at least one search result from the answers, and transmitting at least part of a second view from the server computer system to the client computer system for display at the client computer system, wherein the second view includes the search result.

15. The computer system of claim 7, wherein an advertisement is selected among a plurality of advertisements based on the select category.

16. The computer system of claim 7, wherein the request is a browsing request based on the selected category selected at the client computer system among at least a subset of the categories.

17. A computer method, comprising:
storing a plurality of answers in memory of the computer;
extracting, for each respective single answer, a plurality of related queries corresponding to the respective single answer, at least two of the related queries corresponding to the respective single answer being different from one another;
assigning a category to each of the related queries such that there are a plurality of categories assigned to the related queries corresponding to the respective single answer,
wherein one of the plurality of categories is a spam category and answers in the spam category are not downloaded;
and determining the relevance of the plurality of categories relative to one another and, assigning at least one of the categories assigned to the related queries, corresponding to the respective single answer, to the respective single answer.

18. The method of claim 17, further comprising: extracting at least one data query corresponding to each of the answers; and matching the data query with the related queries.

19. A non-transitory computer-readable storage medium having stored thereon a set of instructions which, when executed by a processor of a computer, causes the processor to execute a method comprising:
storing a plurality of answers in memory of the computer;
extracting, for each respective single answer, a plurality of related queries corresponding to the respective single answer, at least two of the related queries corresponding to the respective single answer being different from one another;
assigning a category to each of the related queries such that there are a plurality of categories assigned to the related queries corresponding to the respective single answer,
wherein one of the plurality of categories is a spam category and answers in the spam category are not downloaded;
and determining the relevance of the plurality of categories relative to one another and, assigning at least one of the categories assigned to the related queries, corresponding to the respective single answer, to the respective single answer.

* * * * *